United States Patent [19]
Hadskey

[11] 3,850,450
[45] Nov. 26, 1974

[54] TOP LINK APPARATUS

[75] Inventor: Glynn E. Hadskey, Baton Rouge, La.

[73] Assignee: James M. Rowe, Forest City, Ark.

[22] Filed: Nov. 27, 1973

[21] Appl. No.: 419,423

[52] U.S. Cl.............. 280/479 R, 280/482, 172/448
[51] Int. Cl............................................... B60d 1/04
[58] Field of Search........ 280/461 A, 460 A, 479 R, 280/482; 172/272, 448

[56] References Cited
UNITED STATES PATENTS
| | | | |
|---|---|---|---|
| 2,959,395 | 11/1960 | Strack et al. | 254/86 R |
| 3,432,184 | 3/1969 | Tweedy | 280/479 R |
| 3,561,789 | 2/1971 | Stikeleather | 280/461 A X |

Primary Examiner—Leo Friaglia
Attorney, Agent, or Firm—John R. Walker, III

[57] ABSTRACT

In a three-point hitch system for allowing an implement to be attached to a typical tractor, a top link apparatus for allowing positive adjustment of the implement relative to the tractor. A hydraulic motor having a screw means rotatably attached thereto is pivotally mounted on the rear end of the tractor. An extension means is pivotally mounted to the implement and is coactively attached to the screw means for movement between extended and contracted positions as the screw means is rotated by the hydraulic motor to positively adjust the implement relative to the tractor in an infinite number of positions.

6 Claims, 3 Drawing Figures

PATENTED NOV 26 1974　　　　　　　　　　　　　　　3,850,450

TOP LINK APPARATUS

BACKGROUND OF THE INVENTION

1. Field of the Invention

This invention relates generally to the hitch systems of tractors and more specifically to the top link of three-point hitch systems.

2. Description of the Prior Art

The following patents relate generally to the present invention: Bartlett, U.S. Pat. No. 2,566,547; Todd, U.S. Pat. No. 2,678,596; Bartlett, U.S. Pat. No. 2,723,472; Henson, U.S. Pat. No. 2,960,172; and Bernotas et al., U.S. Pat. No. 3,527,308. None of the above patents disclose or suggest the present invention.

With farm equipment becoming larger, more sophisticated, and more expensive, it is increasingly important that such equipment be operated at maximum efficiency. Adjustable three-point hitch systems increase the efficiency of farm equipment by allowing numerous adjustments of the position of the farm equipment relative to the tractor. Proper positioning of farm equipment such as plows, bedders, and cultivators reduces fuel consumption, increases tractor speed, gives a more desirable tool performance, allows deeper penetration, and the like.

Prior top link apparatuses in adjustable three-point hitch systems have either been mechanically adjustable by means such as the turnbuckle 36 of the 2,960,172 patent or hydraulically adjustable by means such as the ram 78 of the 2,678,596 patent. However, these prior apparatuses have many disadvantages. For example, the apparatuses that are mechanically adjustable require for safety reasons that the adjustments be made while the tractor is stationary. On the other hand, apparatuses that are hydraulically adjustable are susceptible to changing adjustments due to increases and decreases of hydraulic pressure and the like.

SUMMARY OF THE INVENTION

The present invention is directed towards overcoming the problems and disadvantages in prior top link apparatuses. The concept of the present invention is to provide a top link apparatus which combines mechanical and hydraulic adjustments. More specifically, the top link apparatus of the present invention includes a hydraulic motor, a screw means rotatably attached to the hydraulic motor, and an extension means coactively mounted to the screw means for movement between extended and contracted positions when the screw means is rotated by the hydraulic motor. The hydraulic motor is pivotally mounted to the rear end of a tractor that has a three-point hitch system for attaching various implements thereto. The top link apparatus of the present invention comprises one hitch member of the three-point hitch system. In other words, the extension means of the top link apparatus is adapted to be pivotally mounted to an attachment member of an implement having a three-point attachment. Thus, the implement is positively adjusted relative to the tractor when the extension means moves between the extended and contracted positions as the screw member is rotated by the hydraulic motor.

DESCRIPTION OF THE PREFERRED EMBODIMENT

Figure 1:
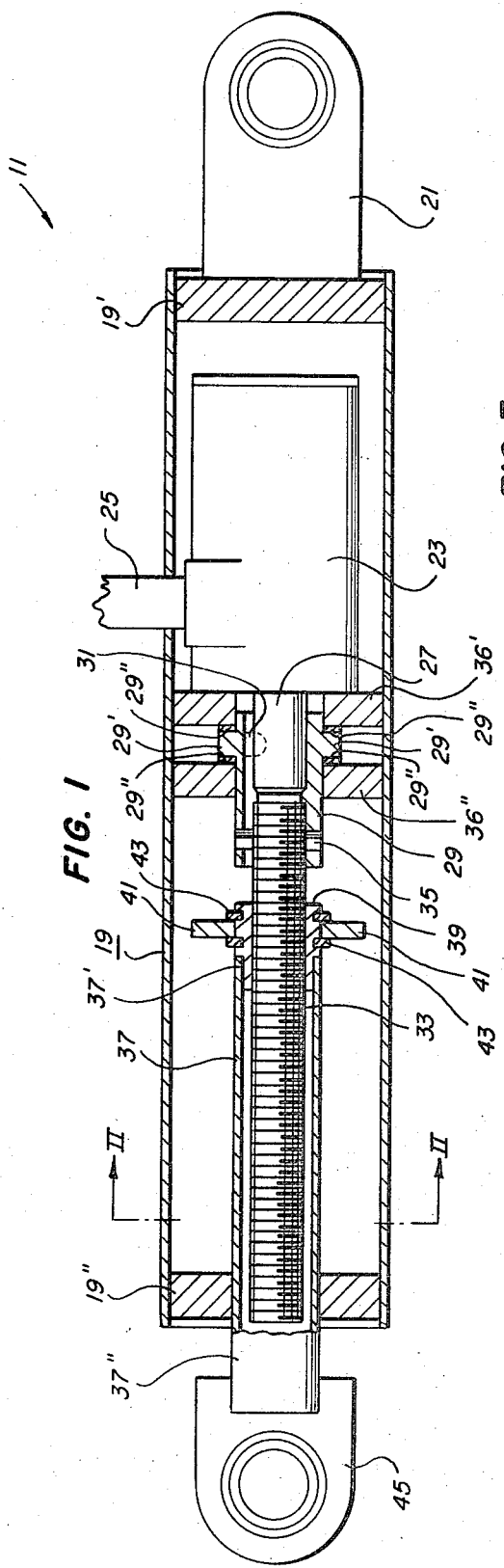
FIG. 1 is a partially sectioned side elevational view of the top link apparatus of the present invention.

The top link apparatus 11 of the present invention is for use with a tractor having a three-point hitch system. More specifically, the three-point hitch system comprises a pair of lift arms 15 (only one being shown) and the top link apparatus 11. The function and operation of three-point hitch systems are well known to those skilled in the art. Basically, the three-point hitch system is for use in attaching a typical farm implement 17 to the tractor 13.

The top link apparatus 11 includes a body 19 having a first end 19' and a second end 19". The first end 19' of the body 19 preferably includes a lug member 21. The lug member 21 pivotally attaches the body 19 to the rear end of the tractor 13 preferably by the means of a ball joint or the like. A typical hydraulic motor 23 is mounted in the body 19. The hydraulic motor 23 is controlled by a typical hydraulic system (not shown), which the tractor 13 is normally provided with, through a pair of hydraulic lines 25 (only one shown). The hydraulic motor 23 includes a rotatable drive member 27 which is rotatable in either direction depending upon the direction of flow through hydraulic lines 25. A coupling means 29 is mounted in the body 19 and is fixedly attached to the rotatable drive member 27 of the hydraulic motor 23 preferably by a key 31. A screw means 33 is mounted in the body 19 and is fixedly attached to the coupling means 29 preferably by a pin 35. The coupling means 29 preferably includes an anti-thrust flange member 29' for preventing any thrust forces from passing between the screw means 33 and the hydraulic motor 23. More specifically, the body 19 includes first and second plate members 36', 36" fixedly attached thereto intermediate the first and second ends 19', 19" with the hydraulic motor 23 fixedly attached to the first plate member 36' by means of bolts or the like and with the anti-thrust flange member 29' positioned intermediate and adjacent the first and second plate members 36', 36" for preventing any longitudinal movement of the coupling means 29 thereby preventing any thrust forces from passing between the coupling means 29 and the drive member 27 of the hydraulic motor 23. The coupling means 29 preferably includes bushing members 29" located between the anti-thrust flange member 29' and the first and second plate members 36', 36" to reduce friction therebetween.

Figure 3:
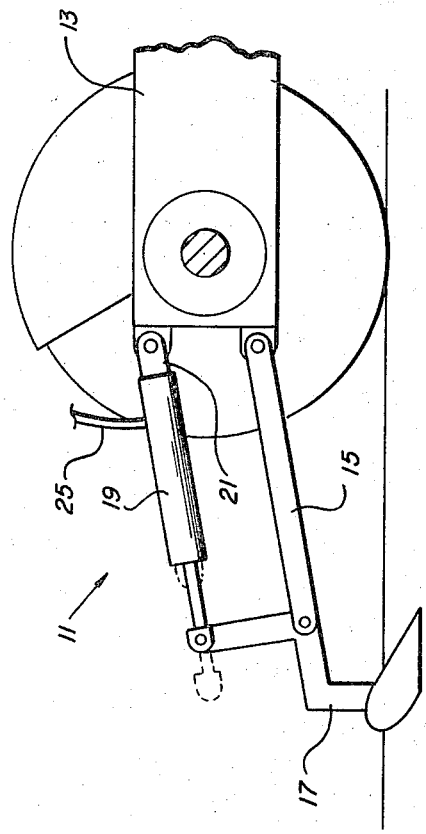
FIG. 3 is a side elevational view of the top link apparatus of the present invention shown attaching a typical farm implement to a tractor, with only a partial sectional view of the tractor being shown.
Figure 2:
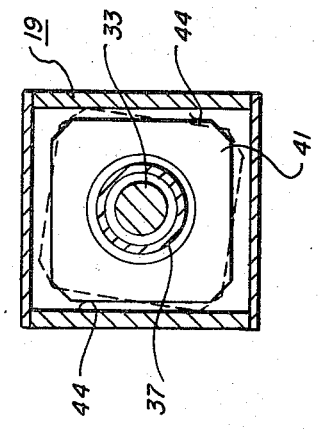
FIG. 2 is a sectional view of the top link apparatus of the present invention as taken on line II—II of FIG. 1 with some parts removed for clarity.

The top link apparatus 11 includes an extension means 37 having a first end 37' nonrotatably mounted in the body 19 and a second end 37" extending from the second end 19" of the body 19. The first end 37' of the extension means 37 includes a nut member 39 fixedly attached thereto as by welding or the like for coactively engaging the screw means 33. Anti-rotation plate means 41 is fixedly attached to the first end 37' of the extension means 37 adjacent the nut member 39 by means of lock rings 43 or the like for preventing the extension means 37 from rotating with the screw means 33 through the nut member 39. Thus, with this arrangement longitudinal movement of the extension means 37 is caused relative to the screw means 33 between extended and contracted positions (see FIG. 3) as the screw means 33 is rotated by the drive member 27 of the hydraulic motor 23 through the coupling means 29. More specifically, the anti-rotation plate means 41 prevents rotation of the extension means 37 by selectively contacting the interior walls 44 of the body 19 (see FIG. 2). That is, when the screw means 33 is first rotated in one direction, the anti-rotation plate means 41 contacts one interior wall 44 of the body 19 thereby preventing rotation of the extension means 37 with the screw means 33. Likewise, when the screw means 33 is rotated in the opposite direction, the anti-rotation plate means contacts the opposite interior wall 44 of the body 19 thereby preventing rotation of the extension means 33. It should be noted that the anti-rotation plate means 41 is able to slide along the interior walls 44 of the body 19 thereby allowing the extension means 37 to move longitudinally relative to the screw means 33 as the screw means 33 is rotated by the hydraulic motor 23. The second end 37'' of the extension means 37 preferably includes a lug member 45 for pivotally mounting the top link apparatus 11 to the implement 17.

The operation of the top link apparatus 11 of the present invention is quite simple. To attach the implement 17 to the tractor 15 through the three-point hitch system, the tractor 15 is backed adjacent the implement 17 and the hydraulic motor 23 is activated to align the lug member 45 with a corresponding attaching member of the implement 17. The lug member 45 is then attached to the corresponding attaching member of the implement 17 by means well known to those skilled in the art. The pair of lift arms 15 are likewise attached to corresponding attaching members of the implement 17 in a manner well known to those skilled in the art. It should be noted that many large tractors and implements are now provided with quick hitch mechanisms which allow the tractor 15 to be attached to the implement 17 by simply aligning the lug member 45 and the pair of lift arms 15 with the corresponding attaching members of the implement 17 and backing thereinto. Next, to properly adjust various factors of the implement 17 (for example, the depth of cut, the angle or pitch of cut, etc.), the hydraulic motor 23 is activated causing the screw means 33 to rotate and, thereby, causing the extension means 37 to move between the extended and contracted positions. These adjustments are preferably made while the tractor is moving, thereby allowing the operator to adjust the implement 17 until the optimum setting is found considering all factors including tractor operation, etc. In this manner, positive and minute adjustment of the implement 17 can be made. Also, increases or decreases of hydraulic pressure to the hydraulic motor 23 will not affect the top link apparatus 11 of the present invention because of the mechanical relation between the screw means 33 and the extension means 37.

Although the invention has been described and illustrated with respect to a preferred embodiment thereof, it is not to be so limited since changes and modifications may be made therein which are within the full intended scope of the invention.

I claim:

1. A top link apparatus for use with a tractor having a three-point hitch system, said apparatus comprising:

a. body means having a first end for pivotally mounting to the rear end of the tractor and having a second end;
    b. hydraulic motor means fixedly mounted in said body means, said hydraulic motor means having a rotatable drive member;
    c. screw means mounted in said body means and fixedly attached to said drive member of said hydraulic motor means for rotational movement therewith; and
    d. extension means having a first end non-rotatably mounted in said body means and having a second end extending from said second end of said body means, said first end of said extension means being coactively atttached to said screw means for causing movement of said extension means between extended and contracted positions as said screw means is rotated by said drive member of said hydraulic motor means, said extension means including a nut member fixedly attached to said first end for coactively engaging said screw means and including anti-rotation plate means fixedly attached to said first end for preventing said extension means from rotating with said screw means through said nut member thereby causing longitudinal movement of said extension means relative to said screw means as said screw means is rotated by said drive member of said hydraulic motor means.

2. The apparatus of claim 1 in which is included anti-thrust coupling means between said screw means and said drive member of said hydraulic motor means for preventing thrust forces from passing between said screw means and said drive member of said hydraulic motor means.

3. The apparatus of claim 2 in which said anti-thrust coupling means includes a flange member and in which said body means includes fixedly mounted first and second plate members for surrounding said flange member of said anti-thrust coupling means and for preventing longitudinal movement of said anti-thrust coupling means thereby preventing thrust forces from passing between said screw means and said drive member of said hydraulic motor means.

4. The apparatus of claim 3 in which said anti-thrust coupling means includes first and second bushing members between said flange member and said first and second plate members of said body means to reduce friction therebetween.

5. A top link apparatus for use with a tractor having a three-point hitch system to attach various implements to the tractor, said apparatus comprising:

a. body means having a first end and a second end, said first end including a lug member for pivotally mounting said apparatus to the rear end of the tractor, said body means having first and second plate members fixedly attached thereto intermediate said first and second ends;
    b. hydraulic motor means mounted in said body means fixedly attached to said first plate member of said body means, said hydraulic motor means having a rotatable drive member;
    c. anti-thrust coupling means mounted in said body means fixedly attached to said drive member of said hydraulic motor means for rotational movement therewith, said anti-thrust coupling means including a flange member position intermediate and adjacent said first and second plate members of said body means for preventing longitudinal movement of said anti-thrust coupling means thereby preventing thrust forces from passing between said anti-thrust coupling means and said drive member of said hydraulic motor means, said anti-thrust coupling means including first and second bushing members between said flange member and said first and second plate members of said body means to reduce friction therebetween;

d. screw means mounted in said body means fixedly attached to said anti-thrust coupling means for rotational movement therewith; and e. extension means having a first end non-rotatably mounted in said body means and a second end extending from said second end of said body means, said second end including a lug member for pivotally mounting said apparatus to the implement, said extension means having a nut member fixedly attached to said first end for coactively engaging said screw means and having anti-rotation plate means fixedly attached to said first end for preventing said extension means from rotating with said screw means through said nut member thereby causing longitudinal movement of said extension means relative to said screw means between extended and contracted positions as said screw means is rotated by said drive member of said hydraulic motor means through said anti-thrust coupling means.

6. The combination with a tractor having a three-point hitch system to attach various implements to the tractor of a top link apparatus, said apparatus comprising:

a. body means having a first end and second end, said first end including a lug member pivotally mounting said apparatus to the rear end of the tractor, said body means having first and second plate members fixedly attached thereto intermediate said first and second ends;

b. hydraulic motor means mounted in said body means fixedly attached to said first plate member of said body means, said hydraulic motor means having a rotatable drive member;

c. anti-thrust coupling means mounted in said body means fixedly attached to said drive member of said hydraulic motor means for rotational movement therewith, said anti-thrust coupling means including a flange member position intermediate and adjacent said first and second plate members of said body means for preventing longitudinal movement of said anti-thrust coupling means thereby preventing thrust forces from passing between said anti-thrust coupling means and said drive member of said hydraulic motor means, said anti-thrust coupling means including first and second bushing members between said flange member and said first and second plate members of said body means to reduce friction therebetween;

d. screw means mounted in said body means fixedly attached to said anti-thrust coupling means for rotational movement therewith; and e. extension means having a first end non-rotatably mounted in said body means and a second end extending from said second end of said body means, said second end including a lug member pivotally mounting said apparatus to the implement, said extension means having a nut member fixedly attached to said first end for coactively engaging said screw means and having anti-rotation plate means fixedly attached to said first end for preventing said extension means from rotating with said screw means through said nut member thereby causing longitudinal movement of said extension means relative to said screw means between extended and contracted positions as said screw means is rotated by said drive member of said hydraulic motor means through said anti-thrust coupling means.

* * * * *